United States Patent
Armen et al.

(10) Patent No.: US 6,578,093 B1
(45) Date of Patent: Jun. 10, 2003

(54) SYSTEM FOR LOADING A SAVED WRITE POINTER INTO A READ POINTER OF A STORAGE AT DESIRED SYNCHRONIZATION POINTS WITHIN A HORIZONTAL VIDEO LINE FOR SYNCHRONIZING DATA

(75) Inventors: Stephen F. Armen, Carlsbad, CA (US); Benjamin Edwin Felta, Cardiff, CA (US); Asif Shakeel, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/487,138

(22) Filed: Jan. 19, 2000

(51) Int. Cl.$^7$ .................................................. G06F 5/06
(52) U.S. Cl. ........................ 710/52; 345/547; 345/558; 365/189.05
(58) Field of Search ................................ 345/534, 545, 345/547, 558, 560, 565, 576; 348/567; 365/189.01, 189.05, 221; 710/52–54, 57; 711/154, 167; 713/400, 500; 375/372

(56) References Cited

U.S. PATENT DOCUMENTS

| | | | | |
|---|---|---|---|---|
| 5,294,983 A | * | 3/1994 | Ersoz et al. ................. | 348/521 |
| 5,703,659 A | * | 12/1997 | Tanaka ......................... | 348/562 |
| 5,905,768 A | * | 5/1999 | Maturi et al. ............... | 370/509 |
| 6,055,285 A | * | 4/2000 | Alston ......................... | 375/356 |

FOREIGN PATENT DOCUMENTS

| EP | 0 758 770 A1 | * | 2/1997 |
| GB | 2 275 852 A | * | 9/1994 |

* cited by examiner

Primary Examiner—Jeffrey Gaffin
Assistant Examiner—Ilwoo Park
(74) Attorney, Agent, or Firm—Foley & Lardner (57) ABSTRACT

The frequency of use of video and other data is increasing. Additionally, video components are typically connected together. The video components may synchronize via a first in first out ("FIFO") queue. Data may be written into the FIFO queue by a component with a first clock rate, and then the data may be read out of the FIFO queue by a component with a second clock rate. Because of the different clock rates, it is possible that there could be an underflow or overflow of data in the FIFO queue. Typically, when the timing between the components is far apart, the read and write pointers that point into the FIFO queue are realigned by using a reset control signal, which sets both pointers back to address zero of the FIFO queue. The present system provides an improved technique for synchronizing the read and write pointers. In particular, the present system provides a technique for aligning the read and write pointers of a FIFO queue at any time and at any random address. This is especially useful to provide synchronization when a FIFO queue is used to pass data from a video system having a first clock rate to another video system having a different clock rate.

17 Claims, 7 Drawing Sheets

SYSTEM FOR LOADING A SAVED WRITE POINTER INTO A READ POINTER OF A STORAGE AT DESIRED SYNCHRONIZATION POINTS WITHIN A HORIZONTAL VIDEO LINE FOR SYNCHRONIZING DATA

FIELD OF THE INVENTION

The present invention relates, generally, to the coupling of asynchronous electronic devices, and, in particular embodiments to synchronization of READ/WRITE pointers in a first in first out ("FIFO") queue.

BACKGROUND OF THE INVENTION

The capability of electronic systems is increasing at a significant rate, as integrated circuit technology improves. The number of transistors which can be placed on an integrated circuit tends to double every 18 months according to a hypothesis which was accurately postulated by Gordon Moore of Intel Corp. over twenty years ago. As more transistors can be integrated into integrated circuits there is a proportional increase in processing power. Because of this increased processing power, applications having data manipulation intensive requirements, as speech recognition, Computer Aided Tomography (CAT) scanning, electronic games and real-time compression of television signals, are now possible.

In particular, the frequency of use and versatility of video data is increasing. For example, video data is used for electronic games, for video teleconferencing systems, for televisions, for Video Cassette Recorders (VCRs), to display movie images on computer monitors and for transmitting moving images via networks such as the internet. Moreover, different video components are often connected together. For example, a video encoder may be connected to a video decoder, and the video encoder and video decoder may transmit data to each other to encode or decode the data respectively.

The connected video components may have different clock rates. The clock rate is the speed at which a digital circuit operates. Every synchronous digital circuit contains one or more internal clocks that regulate the rate at which circuit operations are performed. These internal clocks synchronize the various circuit operations. Different synchronous digital circuits may have differing clock rates, or, even if they are the same clock rate, digital synchronous circuits may have clocks that drift with respect to each other. For example, the microprocessors contained in personal computers may have clock rates anywhere from 4 MHz to over 600 MHz. The faster the clock, the more instructions the microprocessor can execute per second. Clock speeds are generally expressed in megahertz, one megahertz being equal to one million cycles per second.

As data is transmitted from a first component to a second component, the second component may need to synchronize with the data that it is receiving from the first component. For example, a VCR which is recording a video signal on a tape must synchronize itself to the video signal that it is receiving from its tuner. Traditionally circuits containing phase lock loops are used to synchronize a video signal with a display. Another method for synchronizing data between components is by storing the data in a FIFO (First In First Out) queue. A FIFO queue is a data structure used by computing systems that is very similar in concept to the checkout line at a supermarket. Data, like the customers in a checkout line, arrive at the queue and then are taken in turn through the checkout.

In an application that utilizes a FIFO the data that is inserted in a FIFO first will be the first to come out of the queue, hence the designation First In First Out or FIFO. Data arrives in the FIFO and is stored for a period and then is removed, as the receiver of the data is able to accept it. In one scenario a video decoder writes data into a FIFO queue and the video encoder reads that data from the FIFO queue. Data may be written into the FIFO queue by a component with the first clock rate and then the data may be read out of the FIFO queue by a component with a second clock rate. The FIFO queue can be used for synchronization of data across different clock rate domains. The use of a FIFO queue to synchronize data between components of different clock rates has some inherent problems which must be dealt with if reliable operation is to be maintained.

One problem exists because of the different clock rates between the circuits. Because of the different clock rates, it is possible that more data can be written into the FIFO queue than it can hold, causing the FIFO queue to overflow. Overflow can also occur when the second component, which is removing data from the FIFO queue, does not remove data at a fast enough rate so that the data within the FIFO queue reaches a maximum limit. When an overflow condition occurs, some recovery mechanism must be instituted if the circuit is to resume normal operation.

Conversely, it is possible that the write operation will be slower than the read operation. When this condition is present, or if the writing stops into the FIFO queue, an underflow condition may occur. An underflow condition can occur when a circuit calls for data that has not yet been placed into the FIFO queue. In other words, the circuit may call for data that is not in the FIFO queue and hence old data from the queue may be re-read. When an underflow occur, some recovery mechanism must be instituted if the circuit is to resume normal operation. One method of avoiding overflow is to increase the size of the FIFO queue, thereby allowing it to contain more data before it overflows. A second method of attempting to maintain reliable operation between the two circuits is to adjust the clocks within the two circuits so that their frequencies are as close as possible. Neither of these methods are 100% effective. For example, increasing the size of a FIFO may be able to prolong the overflow of data within a FIFO, but it cannot stop the overflow from occurring. Also, in the case where the clocks of these two components have frequencies that are matched, there will still be some difference from the clock in the first component to the clock in the second component unless they are actually locked together. This timing gap will eventually cause an underflow or an overflow condition. In some systems, in addition to increasing the size of the FIFO queue and attempting to lock the clocking signals together, recovery circuits may be used. System designers accept the fact that completely preventing underflow or overflow is difficult and have developed methods to resynchronize the components which have become unsynchronized due to an underflow or overflow in the FIFO queue from which data will be read. In particular, the component that writes to the FIFO queue writes data to the address to which a write pointer points in the FIFO queue, and the component that reads data uses a read pointer, which specifies an address in the FIFO queue. For synchronization, the read and write pointers that point into the FIFO queue are realigned. Some systems perform this synchronization by using a reset control signal which sets both the read and the write pointer back to the address zero of the FIFO queue.

Additionally, some video systems reset a FIFO queue when in a vertical blanking interval (i.e., when no viewable data is being transmitted). Note that blanking refers to the part of a video transmission that has no viewable content, for example, to allow time when the television's electron gun is moving from the bottom to the top of the screen as it scans images. In many systems, this resetting of the read and write FIFO queue pointers occurs when it is known that no data should be in the queue, such as during a vertical blanking interval. When no data should be in the FIFO queue, both pointers may be reset to the same point, typically a zero address. A FIFO queue must be in a known state to reset both pointers and when the FIFO queue is in an empty state, both read and write pointers may be reset to the same point, indicating that the queue is empty. In some systems, the FIFO queue may not be expected to be empty except during vertical blanking, and read and write pointer synchronization cannot occur except during the vertical blanking period.

Conventional systems, however, do not provide aligning read and write pointers of a IFO queue at any time and at any sequential address. In addition, the requirement that the FIFO queue be in a known state to be reset may allow the FIFO to be reset only during the vertical interval. The ability to align read and write pointers of a FIFO at any time or any sequential address would be especially useful to provide synchronization, where a FIFO queue is used to pass data from a video system having a first clock rate to another video system having a different clock rate.

If a FIFO queue can only be reset during a vertical interval, an entire vertical scan may be disrupted by an overflow or an underflow of the FIFO queue until the FIFO queue can be resynchronized during a vertical blanking period.

SUMMARY OF THE DISCLOSURE

Accordingly, to overcome limitations in the prior art described above, and to overcome other limitations that will become apparent upon reading the present specification, preferred embodiments of the present invention relate to the synchronization of components having different clock rate domains and sharing a FIFO queue.

A preferred embodiment of the present system involves an improved technique for synchronizing the read and write pointers using a FIFO queue.

In particular, preferred embodiments of the present system provide a technique for aligning the read and write pointers of a FIFO queue at any data location without requiring the FIFO queue to be empty. This is especially useful to provide synchronization when a FIFO queue is used to pass data from a video system having a first clock rate to another video system having a different clock rate. It, however, can be used to synchronize other asynchronous circuits.

In one preferred embodiment, when an end of line of data that is being written into the FIFO queue is detected, the current address of the FIFO write pointer is stored. When the end of line on the read side is detected, the read pointer is set to the stored write pointer location. This method allows for resynchronization of the FIFO queue on a line by line basis.

Embodiments of the present invention are described herein, in terms of lines of video data. Those skilled in the art will realize that this is by the way of illustration only, as an example likely to be commonly familiar with practitioners in the art. Further embodiments, however, have wide applicability to other forms of synchronization of streams of data. Yet further embodiments have applicability to other techniques within the field of video display, such as the display of one field of data encapsulated within another, such as is present in a picture in picture display on a common television set.

DETAILED DESCRIPTION OF PREFERRED EMBODIMENTS

In the following description, reference is made to the accompanying drawings, which form a part hereof, and in which is shown by way of illustration specific embodiments in which the invention may be practiced. It is to be understood that other embodiments may be utilized as structural changes may be made without departing from the scope and inventive concepts of the present disclosure.

Embodiments of the present invention relate, generally, to data synchronization across different clock rate domains using a FIFO queue to transfer data between the domains. The technique illustrated in embodiments of the present invention may be used when a FIFO queue is used to transfer data between any two components. However, for the purposes of simplifying this disclosure, preferred embodiments are described herein with relation to a video decoder and a video encoder that write data into the FIFO queue and read data from the FIFO queue, respectively. This exemplary embodiment is chosen as an example likely to be familiar to those skilled in the art, but is not intended to limit the invention to the example embodiment. The examples disclosed are intended to illustrate the inventive aspects of this disclosure, and not to limit them.

Synchronization systems, described to illustrate preferred embodiments of the present invention, typically include a FIFO queue and read and write components. The read and write components may have different clock rates. Additionally, the read component accesses the FIFO queue using a read pointer that indicates the location in the FIFO queue from which data is to be read. The write component accesses the FIFO queue using a write pointer that indicates the location in the FIFO queue at which the data is being written.

When the FIFO queue underflows or overflows the read and write pointers must be resynchronized, as the present data within the FIFO queue is either old, in the case of an underflow, or not current, in the case of an overflow. In essence, when the FIFO queue overflows or underflows, the FIFO data structure has "crashed" and must be resynchronized. Generally resynchronization of FIFO queues occur when the read and write pointers are set to zero, thereby defining the FIFO queue as empty. This leads to some difficulty if data is being streamed from one system to another. This difficulty occurs because, when the overflow or underflow of the queue occurs, there is no effect on the stream of incoming data. That is, the stream of incoming data keeps coming and is not interrupted.

One method of synchronization during overflow or underflow would be to simply take the read pointer and load the value of the write pointer into the read pointer. The read and the write pointers would then be synchronized. The difficulty is that when the read and write pointers are synchronized by merely writing the value of the write pointer into the read pointer, the pointers are synchronized at an unknown point.

This point can be better appreciated by considering a frame of date displayed on a television screen. For the sake of argument, assume that the first video circuit is a VCR-type circuit and the second circuit is a circuit within the television type display which is actually displaying the video information upon the screen. Also assume that instead of the standard method of phase locking the display to the VCR signal, a FIFO queue is inserted between the two signals for the purpose of synchronization. Assume further that, as the VCR system is sending data to the FIFO queue and the television display is displaying data from the FIFO queue, the FIFO crashes. In the aforementioned approach, wherein the read FIFO pointer was set to the value of the write FIFO pointer, the picture on the screen would be displaced from its natural position.

To more clearly envision this, imagine that the read pointer is displaying data at the very beginning of a line when the FIFO queue crashes. Also assume that the write pointer is writing data that represents the middle of the picture into the FIFO queue. If the read pointer were immediately set to the write pointer, then the data that is being written, that is, data from the center to the right hand of the screen, would be displayed on the left hand side of the screen where the read pointer was currently displaying data. The picture would then appear to have shifted from the center of the screen to the left half of the screen and the display would generally be scrambled.

In such a system, one would have to wait until the read pointer were not displaying any data and the write pointer were not writing any data in order to be sure that the two could be synchronized. The most obvious place to do this synchronization would be within the vertical interval of the picture. During the vertical integral time, if the read and write pointers are out of sync by less than the time of the vertical interval, the VCR system would not be writing data into the FIFO queue, nor would the display system be reading data from the FIFO queue. The two pointers could then be synchronized and, when data once again resumed, the FIFOs would be operating and the pictures would be synchronized. This type of synchronization has been used in prior synchronization systems. Because of the limitation that both the read and write system must wait until a point where no data is present in the queue, in some of these systems, reset can only occur during the vertical interval, when the electron beam which traces the picture on the CRT screen is not displaying any picture data because the beam is moving from the bottom of the screen and retracing to the top of the screen in order to begin the display of the next picture frame.

Figure 1A:
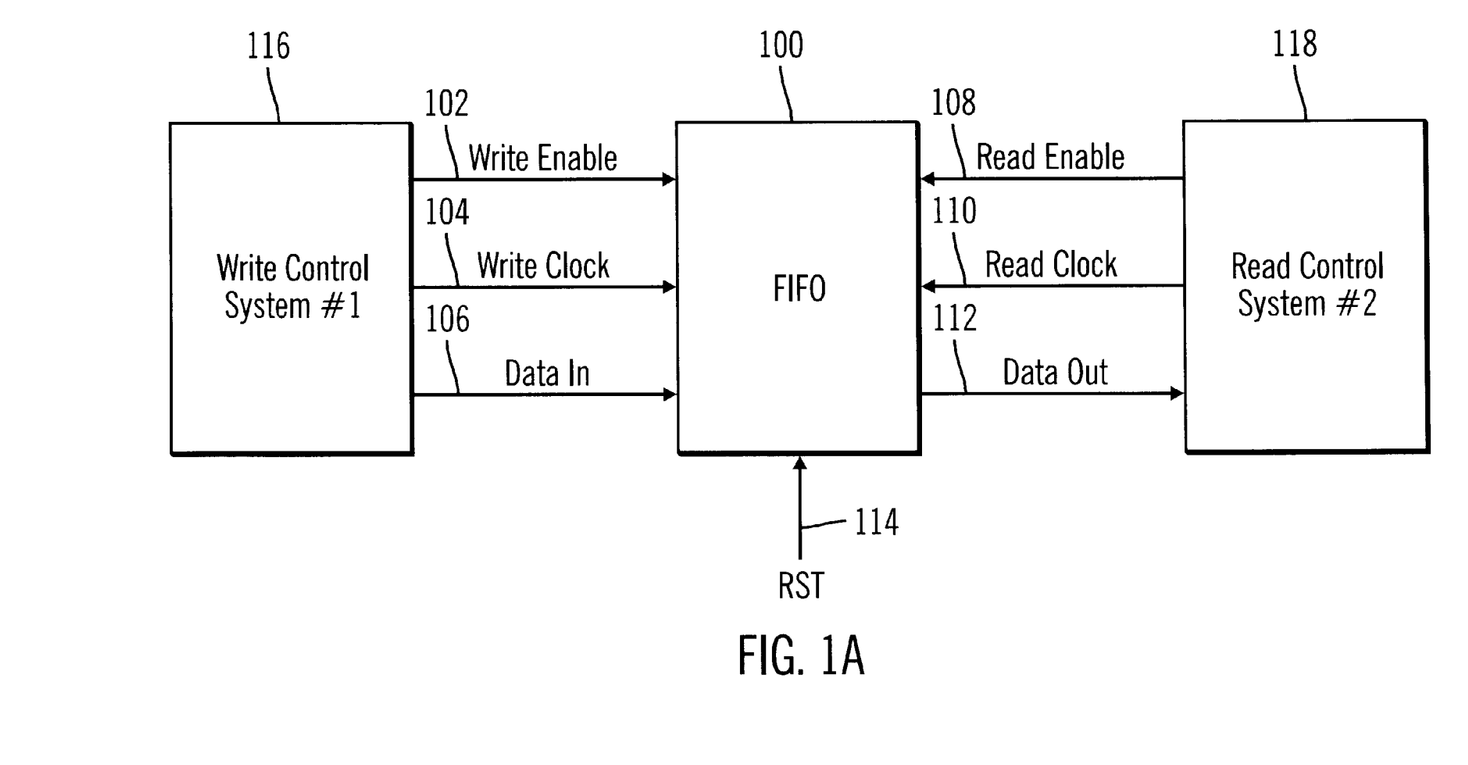
FIG. 1a is a block diagram of an electronic environment illustrating a conventional FIFO data coupling between electronic systems.

FIG. 1a is a block diagram illustrating a system environment according to examples of a conventional system. FIG. 1a illustrates a FIFO queue 100, a write control system 116 and a read control system 118. The FIFO queue 100 has a write enable line 102 that provides a signal to enable writing by the data input line 106. The write clock 104 maintains a first clock rate for a component that writes into the FIFO queue 100, such as a video decoder. Another component, such as a video encoder, can use the signal from the write clock to lock onto the write signal. The read enable line 108 enables the reading of the data via the data output line 112. The read clock 110 maintains a second clock rate for a component that reads from the FIFO queue 100, such as a video encoder. A reset line ("RST") 114 resets the write and read address pointers to address zero of the FIFO queue 100.

Preferred embodiments of the present invention enable a video encoder having the ability to lock to a video decoder, to lock onto any one of a variety of video decoders. The encoder and decoder may have different clock rates, however their line rates must be similar. The encoder and decoder are "loosely locked" together, meaning that the time gap between the line timing of the decoder and the line timing of the encoder is maintained within a given ranger. The encoder tracks the decoder line timing and allows for a certain range of differences between decoder timing and its own encoder line timing. The encoder clock frequency is adjusted to achieve and maintain a difference in those line timings that is within an acceptable range.

A FIFO queue is used to adjust for the time differences between the decoder line timing and the encoder line timing. The FIFO queue is not in a desired state, if the timing gap between the decoder line timing and the encoder line timing is so large that the FIFO overflows or underflows. For example, if the decoder line timing is ahead of the encoder line timing by too much, the FIFO queue will fill up and be unable to continue to accept additional data without overwriting existing data, leading to an overflow condition. Additionally, if the decoder line timing is behind the encoder line timing, the FIFO queue will underflow and previously read data will be read again.

Figure 1B:
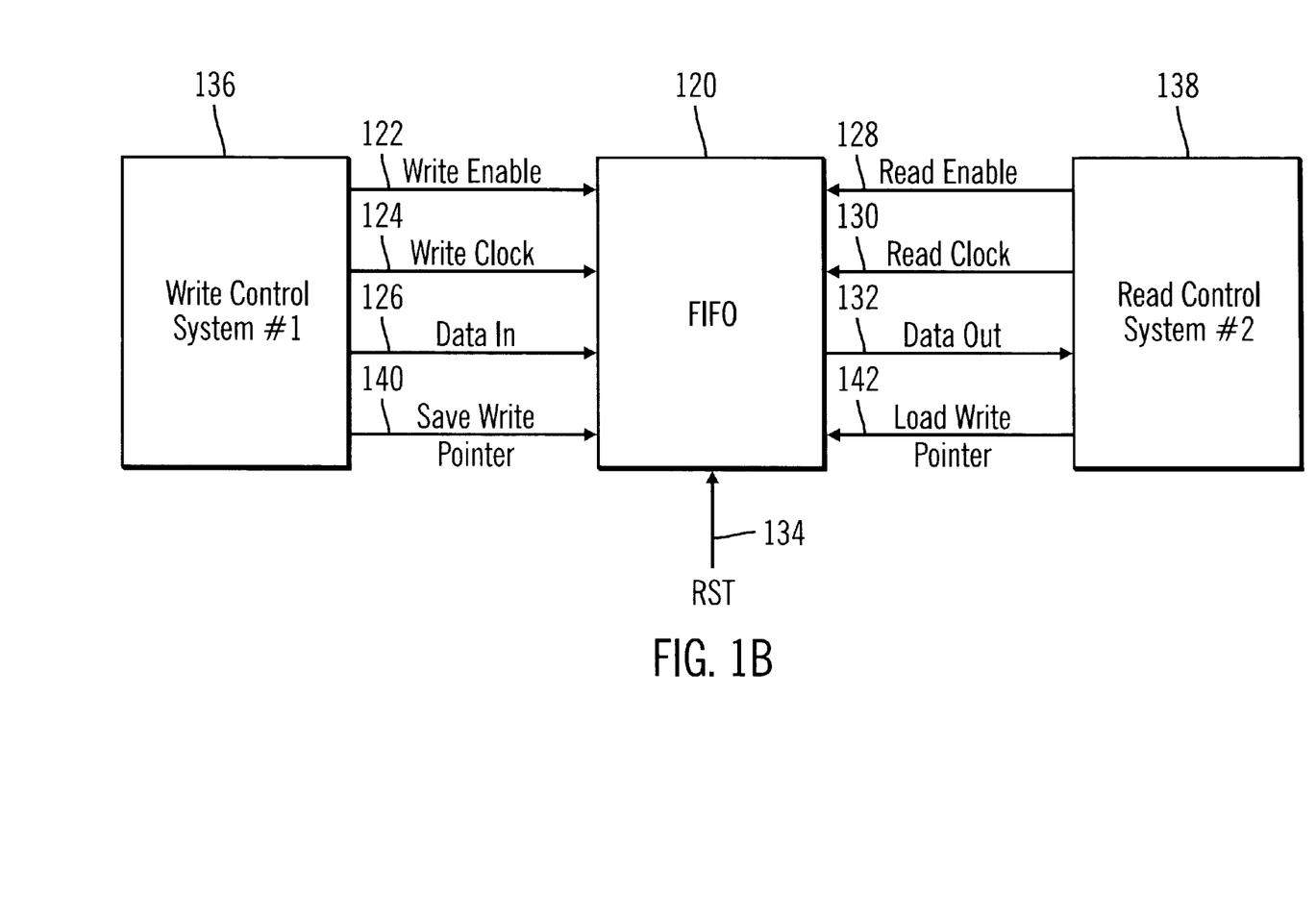
FIG. 1b is a block diagram of an electronic environment illustrating an example FIFO data coupling between electronic systems according to an example embodiment of the present invention.

FIG. 1b is a block diagram of an electronic environment illustrating an example FIFO data coupling between electronic systems according to an example embodiment of the present invention. In the present embodiment of the invention, a new circuit involves a read pointer circuit which can sense and asynchronously record the position of the write pointer. The write pointer address thus recorded can then be synchronously downloaded into the read address pointer. This action serves as an alternate or intermediate reset, which aligns the read and write pointers at any possible address. For purposes of illustration, this embodiment of the invention realigns the pointers at the end of each horizontal video scan line being read. Those skilled in the art will, however, recognize that the realigning at the end of the horizontal line of the read pointer is an arbitrary selection. The realignment can take place at any arbitrary address for various reasons. For example, embodiments of the invention may be used to align the placement of a picture in picture-type display on a normal size television display. FIG. 1b illustrates a FIFO queue 120. The FIFO queue 120 has a write enable line 122 that provides a signal to enable writing of the data by write control system #1 136 on a line 126. The write clock 124 maintains a first clock rate for a component that writes into the FIFO queue, such as a video decoder. The read enable line 128 enables the reading of the data via the data out line 132. The read clock 130 maintains a second clock rate for a component that reads from the FIFO queue 100, such as a video encoder. A reset line (RST) 134 resets the write and read pointers to the first location in the FIFO.

The write control of system one 136 provides a save write pointer signal 140. The save write pointer signal indicates when the write pointer corresponds to a predetermined position within the data to be written, and causes the write pointer address to be saved when that position within the data to be written is reached. The read control of system #2 138 provides a load write pointer signal 142. The load write pointer signal indicates when the next data within the data to be read will be for the predetermined synchronizing position, and causes the saved write pointer address to be loaded into the read address pointer.

Figure 2:
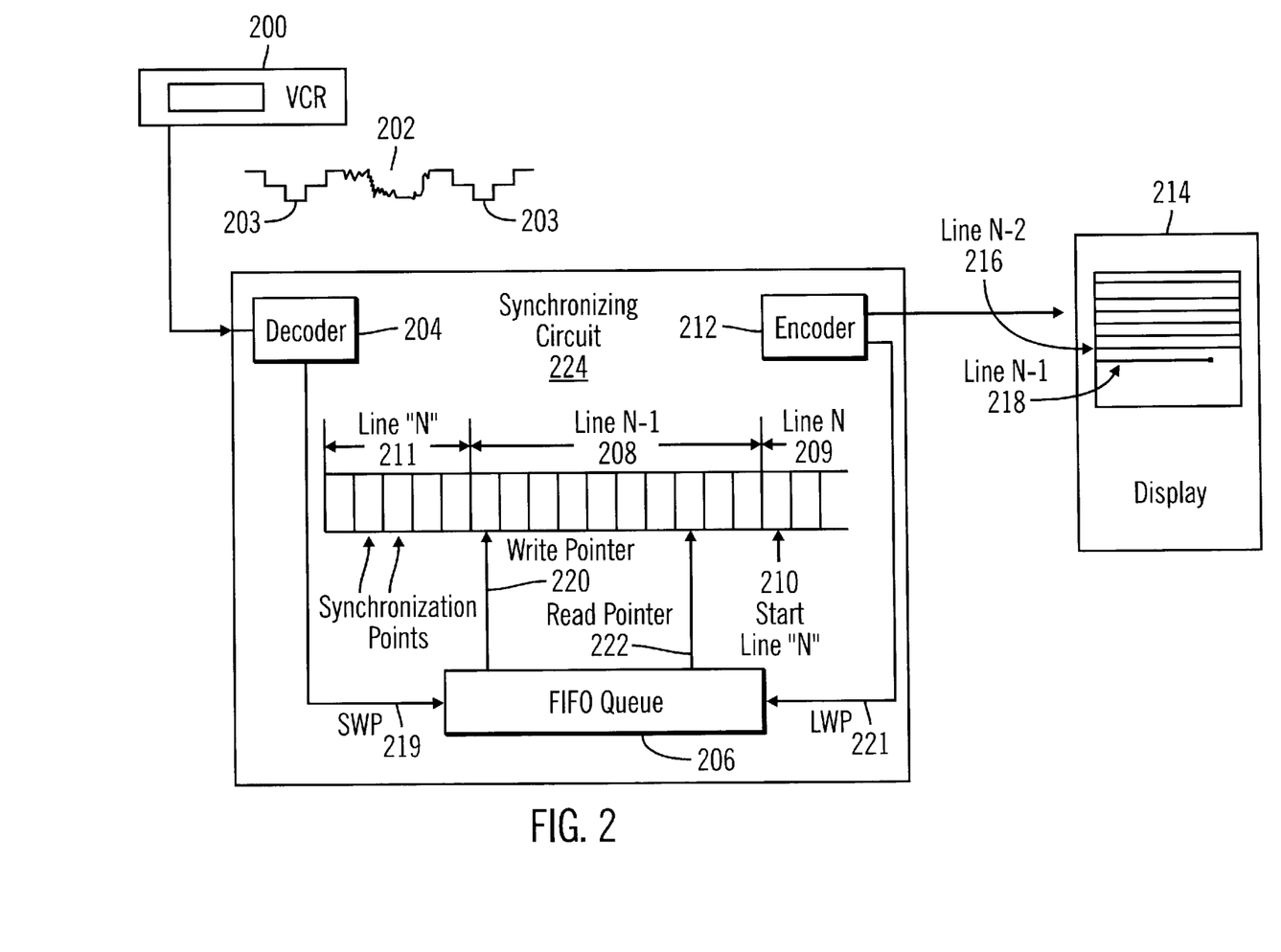
FIG. 2 is an illustration of a FIFO queue being used to synchronize a VCR to a television type display.

FIG. 2 is an illustration of a FIFO queue being used to synchronize a television type display to a VCR. In FIG. 2 an example of a system in which the previous embodiment of FIG. 1b may be used to synchronize two well known systems, is illustrated. The system in FIG. 2 comprises a VCR 200 which is linked to a display 214 via a synchronization circuit 224 containing a FIFO 206. Generally VCRs are coupled directly to displays such as a common television set. With such a direct coupling, the display merely locks to the frequency of the VCR and displays the video data 202 from the VCR.

The synchronization circuit 224 of FIG. 2 is an alternate way to lock a VCR to a display device, such as a television set. At first, such a synchronization scheme may seem to be superfluous, as the VCR 200 can be locked to the display device 214 by connecting them directly without the use of a synchronization circuit 224. Synchronization circuit 224, however, provides the ability to modify the display, as the signal comes from the VCR. For example, synchronization circuit 224 may be used by a video character generator circuit to place character lettering on the display over the picture information, which is being received from the VCR. Additionally, synchronization circuit 224 may be used to convert the unstable timing of the analog signal generated by the VCR 200 to the stable timing of the analog signal generated by the encoder 212.

Synchronization circuit 224 can also be used to display other video streams besides character generation. For example, picture in picture displays may be displayed on the display device, while the VCR 200 is displaying its video data. The synchronization circuit 224 accepts video data 202 from the VCR 200. The video data 202 is provided to the decoder 204, and is converted to a digital signal.

The digital signal from the decoder 204 is in the form of a sampled video signal. Each individual sample in the active video region of the signal, which comprises picture information, is written into the FIFO queue 206 by the decoder 204. A write pointer 220 determines the position in the FIFO queue 206 where the digital video from the decoder 204 is written. After an element of the digital video is written into the FIFO queue, the write pointer then advances to the next FIFO queue slot in preparation for the video data to be written into the next empty slot in the FIFO queue. After the next slot has digital video data written into it, the write pointer again advances.

The read pointer 222 also points to a slot in the FIFO queue. But, instead of being a slot in which data is to be written, the slot pointed to by the read pointer 222 is a slot from which data is to be read. The encoder 212 reads the digital data from the slot in the FIFO queue to which the read pointer points. After the encoder 212 has read the digital data, the read pointer advances to the next slot in the FIFO queue to be read. The encoder reads digital data from the FIFO queue at a rate so that it may be displayed on the lines of the display device 214. In other words, the encoder 212 reads data from the FIFO queue as it is needed to be displayed. The encoder generates timing signals and embeds them in the analog signal it produces. These timing signals are extracted by the display and used to control its timing, to lock that timing to the incoming signal.

In the illustration, line (N−1) 218 is shown on the display as being partially complete. Line N−1 follows line (N−2) 216 on the display. The encoder 212 provides the display device with an analog value to be displayed, which it is receiving from the FIFO queue. The encoder reads digital video values from the FIFO queue, as they are needed at a location pointed at by the read pointer 222. In the illustration in FIG. 2 line (N−1) 218 is partially displayed on the display. Part of line N 209 and 211 is within the FIFO queue, in a position where it will be read later. In addition, within the FIFO queue is part of line (N−1) 208. The decoder is in the process of inserting digital values representing values of the video data 202, which are present on line N.

In the present example embodiment, the display is displaying N−1 while the VCR is producing a video signal that is part of line N. The FIFO queue 206 thereby acts as a buffer between the VCR and the display, temporarily holding the digital video data values prior to their use by the display device. If the encoder and the VCR were in lock step, that is were driven by clocks that were perfectly synchronized, there would be no need for the FIFO 206 in synchronization circuit 224. VCR 200 and encoder 212, however, are independent asynchronous pieces of electronic machinery and, even if the clock frequencies are closely matched, it is difficult to exactly match the clock frequencies. Even if the clock frequencies could be matched, the clock frequency of the VCR would have a tendency to drift, as would the clock frequency of the display device. The drifts of the clocks would not be synchronized and would result in desynchronization of the VCR and encoder.

A preferred embodiment of the invention, of which FIG. 2 represents a part, functions by setting the read pointer at the end of each read display line. As each line is traced on the display 214, it is scanned from left to right. When the scan has reached the right side of the display, an end of line is reached. When an end of line is reached on the display the scan is blanked and the electron beam which traces the line on the display is blanked out so that the electron beam may be swept from the right side of the screen to the left side of the screen without writing upon the screen. This rapid sweeping of the electron beam from the right side of the display device to the left side of the display device, without writing any information on the display, is called retrace, or the blanking period. During retrace, the electron beam is positioned back at the left side of the screen so that it may again begin writing the scan of the next line on the display.

The video data 202 has a similar blanking period. The video data 202 is an electronic waveform which represents the line which is traced on the screen. Therefore, each line of video data is contained between two adjacent synch pulses 203. The synch pulses are designed to coincide with the retrace on the display.

In operation, the decoder 204 continually reads the video data 202. When a new line of data is detected by the decoder, it generates a pulse in the save write pointer signal (SWP) 219. This causes the FIFO control 224 to save the write pointer address. It saves the write pointer address at the start of the new line N, illustrated in the FIFO queue 206 as occurring at start line N 210. Then, when the encoder 212 has finished reading a line of data, it generates a pulse in the load write pointer signal (LWP) 221. This causes the FIFO control 224 to load the previously captured value of the write pointer, i.e. at start line N 210 into the read pointer 222. In this way, the read pointer is synchronized with the beginning of line data at the beginning of every line. This synchronization occurs during retrace in the present embodiment, but those skilled in the art will recognize that this synchronization at the end of line is arbitrary and serves for illustration purposes only. This synchronization can occur at any arbitrary point within the video scan.

One advantage provided by preferred embodiments of the invention is that the read pointer can be realigned at any write pointer address, rather than at, for example, only address zero. The circuit of the embodiment of the present system is discussed more in detail below with reference to FIG. 3. Another advantage provided by preferred embodiments of the invention is that the synchronization of the read and write pointers does not need to occur during a period when the FIFO should be empty, and the synchronization of read and write pointers occur even if the FIFO is never empty.

Figure 3:
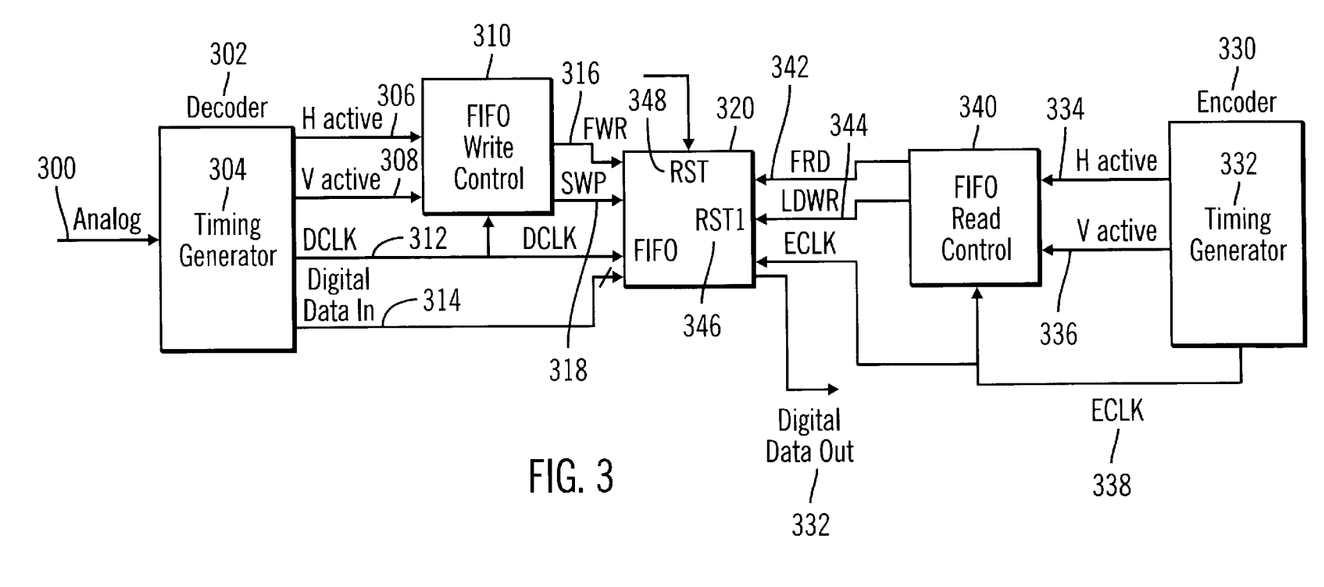
FIG. 3 is a detailed block diagram illustrating a FIFO queue system according to an example embodiment of the present invention.

FIG. 3 is a block diagram illustrating a system environment according to an example embodiment of the present system. Analog signals 300 are introduced to the decoder 302. The decoder 302 comprises a timing generator 304. The timing generator 304 analyzes the analog signals 300 (e.g., video input) and generates an H active signal 305 and a V active signal 308. The H active signal represents a starting point indicating where data starts in a horizontal dimension and continues till the end of the line. A V active signal 308 represents a starting point indicating where data starts in a vertical dimension and continues tilt the end of the vertical scan. The decoder 302, transmits the H active signal 306 and the V active signal 308 to a FIFO write controlled block 310. Additionally, the decoder 302 transmits a clock signal, shown as "DCLK" 312 which represents the decoder 302 clock rate. The DCLK signal 312 is also input to the FIFO 220. Moreover, decoder 302 converts the analog signal 300 to a digital signal, which is coupled into the FIFO 220 as a digital data signal 314. The analog to digital conversion is performed using the decoder clock rate 312.

The FIFO write control block 310 receive the H active signal 306, the V active signal 308, and the DCLK signal 312 and provides a provides a write enable signal, shown as "FWR" 316 and a save write pointer signal shown as "SWP" 318 to the FIFO 320. The write enable signal 316 enables the digital data in signal 314 to be stored into the FIFO 320.

The save write pointer signal 318 causes the position of the write pointer to be saved. This saved position may be used later to realign the read pointer with the write pointer. The position of the write pointer is saved at the end of each line of data that is written into the FIFO 320. The saving of the write pointer at each line of data is arbitrary. The value of the write pointer can be saved at any arbitrary point. The saving of the write pointer position of at the end of each line of data has been selected for illustrative purposes and is not intended to be construed as a limitation.

The encoder 330 comprises a timing generator 332. The timing generator 332 generates a H active signal 334 and a V active signal 336 which are transmitted to a FIFO read control block 340. The V active signal 336 specifies the active portion of the vertical scan, the H active signal 334 represents the active portion of the horizontal scan. The H active and V active signals may be used when displaying the digital data out signal 322 on, for example, a television monitor. Additionally, a clock signal, shown as "ECLK" 338, is transmitted from the encoder 330 to the FIFO read control block 340. The FIFO read control block 340 processes these signals and generates a read enable signal, shown as "FRD" 342 and a load write pointer signal, shown as load write pointer signal "LDWR" 344. The load write pointer signal 344 functions, in essence, as a reset, shown as "RST1" 346.

The encoder 330 determines when to set the read pointer to the saved value of the write pointer. The encoder 330 makes the determination by observing the H active signal. When the H active signal transitions to a low value, it signifies that a line is inactive (i.e. in the blanking period) and not being encoded, that is, a line is being retraced. When the H active signal transitioning to inactive is detected by the FIFO read control 340, the load write signal "LDWR" 344 is then coupled into reset 346. The LDWR signal activates "RST1" reset 1 signal 346. The activation of RSTI within block 320 resets the read pointer to the saved value of the write pointer. The saved write pointer within block 320 is then coupled into the read pointer thereby resetting and synchronizing the FIFO queue.

A traditional reset shown as "RST" 348, may be used to reset the read and write pointers to address zero. In the illustrated embodiment of the invention, the RST signal 348 may be used to align the read and write pointers 20 when initializing the system.

Figure 4:
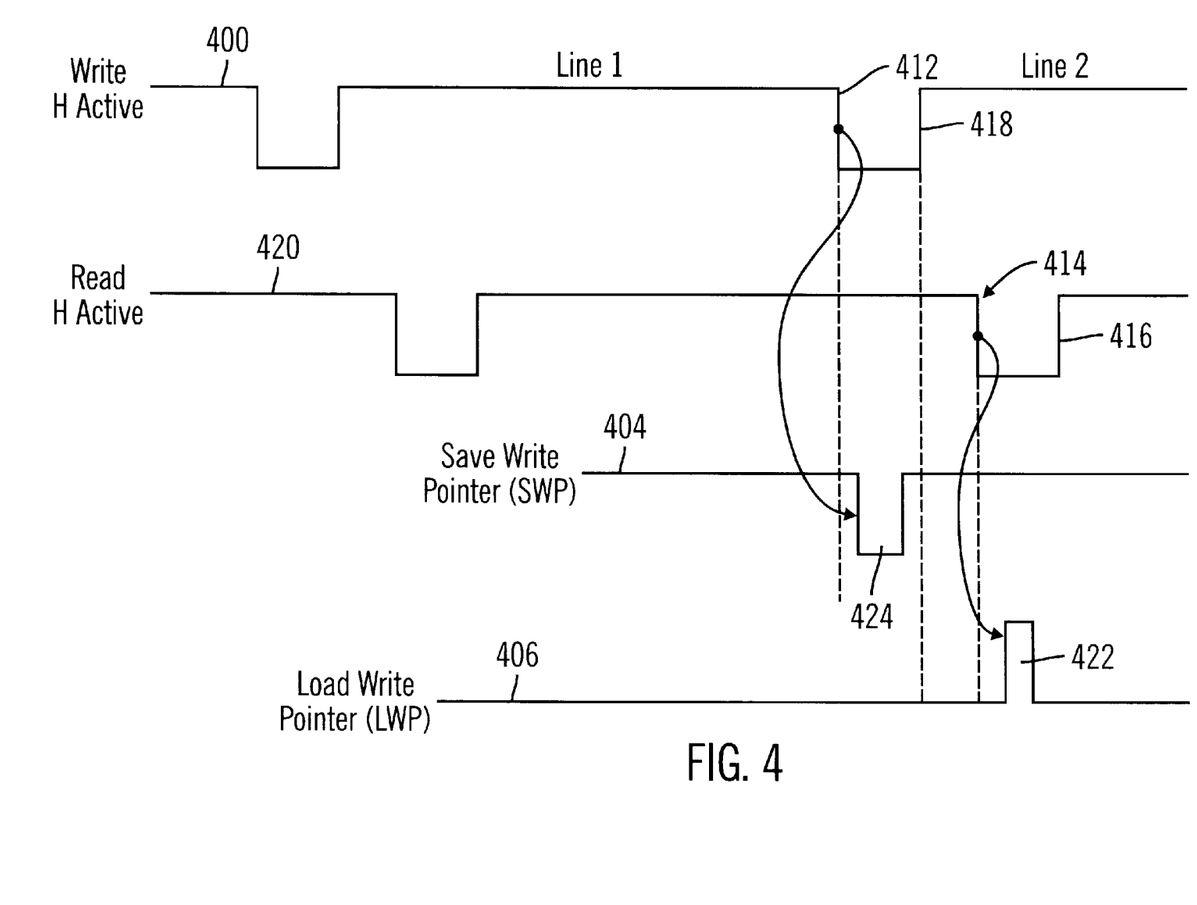
FIG. 4 is a waveform diagram illustrating the signals produced by an example embodiment of the invention.
Figure 5:
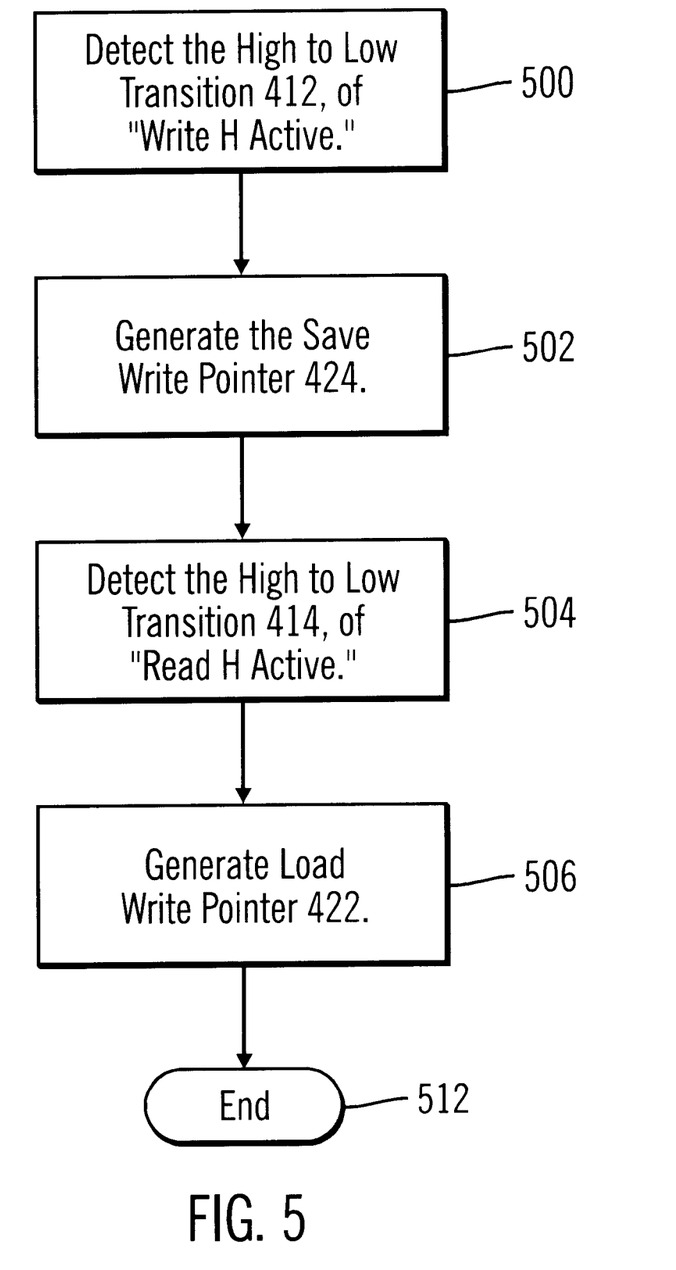
FIG. 5 is a flow diagram illustrating steps performed in utilizing the example embodiment of the present system illustrated in FIG. 4.

FIG. 4 is a waveform diagram illustrating the signals produced by an example embodiment of the invention. Signal 400 is the write H active signal. The write H active signal is high when line data is being written into the FIFO queue. At the end of a line, when digital data is no longer being written into the FIFO queue, the write H active signal transitions from high to low as illustrated at 412. The read H active signal 420 similarly to the write H active signal is high when digital line data is being read. When digital line data is not being read, the H active signal drops as seen at 414, signifying that data is not being read by the system. When the write H active signal transitions low 412, it triggers a pulse signal known as save write pointer (SWP) 404. This pulse triggers the capturing of the value of the write pointer. That is, it causes the address that the write pointer is pointing at in the queue to be stored in a latch for use later. The SWP signal then returns to a high level.

The SWP signal must return to a high level before the write pointer is changed to point at a new value, which in this example is before the write H active signal returns to a high level 418. If the Save Write Pointer signal 404 does not return to a high level before the write pointer changes does not, an incorrect value may be written into the latch. When the read H active signal 420 transitions to a low level as seen at 414, the Read H Active signal 420 triggers a second pulse called the load write pointer signal (LWP) which then causes the value that was stored in the save write pointer latch to be loaded into the read pointer. The Load Write Pointer pulse 422 signal must return to a low level before the read pointer changes, which in this example is before the read H active signal transitions to a high level at 416. If the Load Write pointer 422 does not return to a low level, the read pointer will be held at the saved write pointer address beyond the desired synchronization point and would not achieve correct synchronization. If the desired synchronization point is within the active data region, i.e. at a time other than the blanking period, then the save write pointer pulse would not be longer than one write clock period and the load write pointer pulse would not be longer than one read clock period. FIG. 5 is a flow diagram illustrating a process for implementing an example embodiment of the invention. Block 500 of FIG. 5 illustrates the first step of the process.

The first step 500 is the detection of the high to low transition 412 of the Write H active line 400. The high to low transition 412 is an indicator that data is no longer being actively written into the FIFO queue. The second step of the process represented by Block 502 is the generation of the save write pointer pulse 424 in the save write pointer signal 404. This generation of the save write pointer pulse is triggered by the high to low transition 412 of the Write H Active signal. The save write pointer signal pulse 422 causes the value of the write pointer of the FIFO queue to be written into a storage register. The next step of the flow process, Block 504, is to detect the high to low transition 414 of read H active, which signifies that data is no longer being actively read from FIFO queue. The next step in the process is represented by block 506, wherein the load write pointer pulse 422 in the load write pointer signal 406 is generated. The transition 414 from high to low of the read H active causes the load write pointer pulse 422 to be generated. The flow process ends in Block 512.

Figure 6:
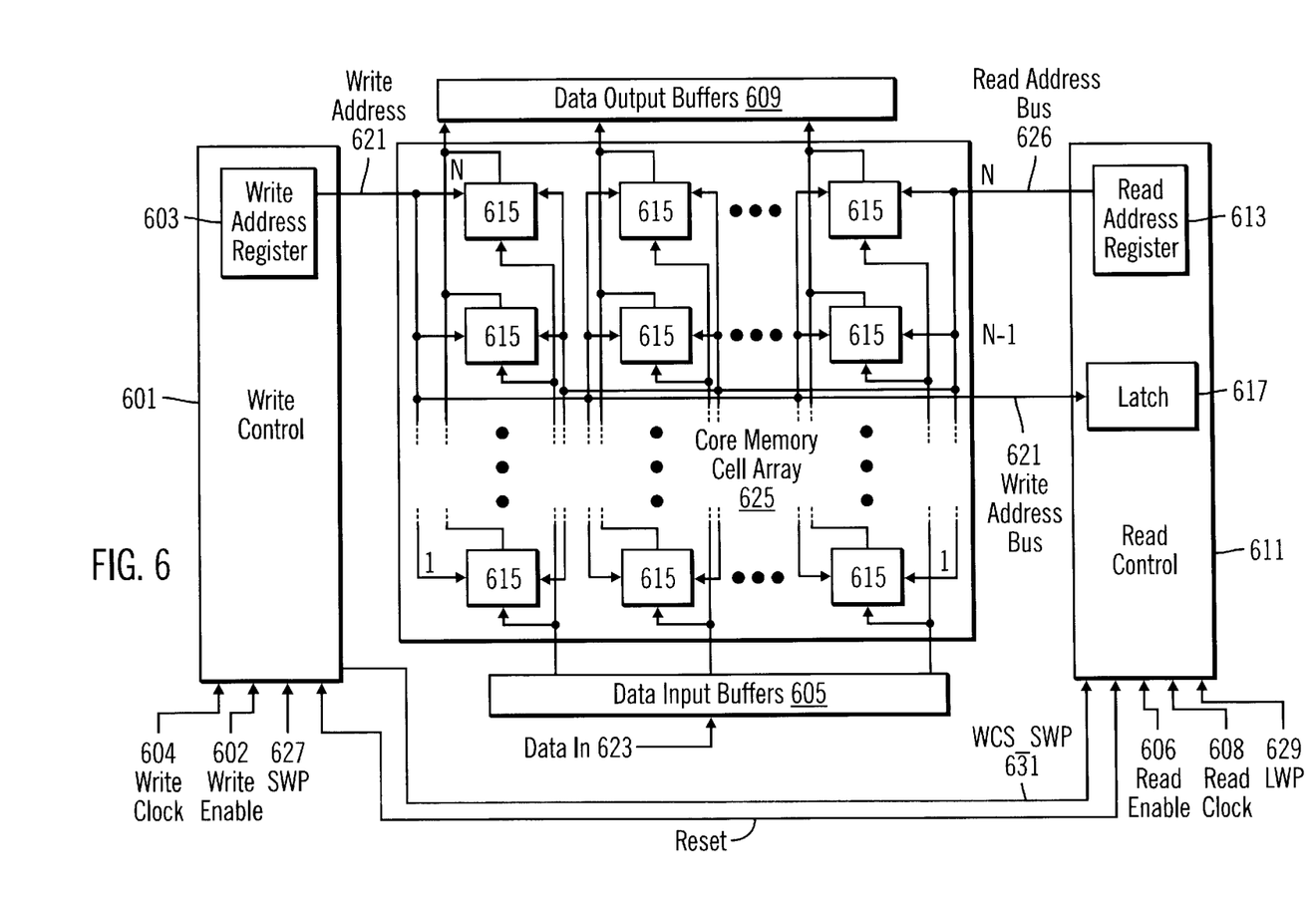
FIG. 6 is a block diagram illustrating an implementation of an embodiment of the invention.

FIG. 6 is a detailed block diagram of an embodiment of the invention, illustrating three main blocks. The first Block 601 is the write control, and is used for controlling the writing of the data into the FIFO queue The second main block is the read control 611, for controlling reading of the data from the FIFO queue. The third block, the core memory cell array 625, is a dual ported RAM array, which comprises the elements of the FIFO queue. The core cell memory array 625 comprises an array of dual ported RAM cells 615 into which data from data input buffer 605 may be written and data output buffer 609 from which data may be read. Write clock 604, write enable 602, reset 600, and save write pointer (SWP) 627 are provided to the write control block 601. The write address register 603 of the write control 601 generates the write address 621 which is provided to the core memory cell array 625, to provide the address where the data in 605 is written into the core memory cell array 625. Read clock 608, read enable 606, reset 600, and load write pointer (LWP) 629 are provided to the read control block 611. The read address register 613 contained within the read control 611 provides the read address 625 which controls the point from which the data is read from the core memory cell array 625. The write address 621 is also coupled into the read control 611 and further coupled to a latch 617 within the read control. The save write pointer (SWP) signal 627 is synchronized to the write clock 604 in the write control block 601 to generate the write clock synchronized save write pointer signal (WCS_SWP) 631. Within the read control 611 the WCS_SWP 631 from the write control 601 controls the writing of the write address 621 into the latch 617. The load write pointer 629 controls the writing of the value within the latch 617 into the read register 613 in the read control 611. It is the value within the read address register 613 that generates the read address 626 by which data is read out of the core memory cell array 625.

The embodiment illustrated in FIG. 6 preferably functions in the following way. The write control 601 generates write addresses 621, which control the locations where the data in 605 is written into the core memory cell array 625. The write address is also coupled to the read control 611. At a predetermined point within the input data stream, the save write pointer signal (SWP) 627 will pulse indicating that the current write address 621 is a synchronizing point. This pulse 424 is synchronized to the write clock to generate the write clock synchronized save write pointer signal which the read control 611 then uses to latch the current write address 621 into the latch 617. The write address 621, which has been coupled to the latch 617, is the address to which the read control will be synchronized. At a predetermined point in the output data stream, the load write pointer signal 629 will generate a pulse 422. This pulse 422 is synchronized to the read clock in the read control 611 and used to load the address saved in latch 617 into the read address register 613. The read control will then begin to read data from the address which has been loaded into the read register 613, by placing that address on the read address line 625.

The embodiment of the invention illustrated in FIG. 6 can be illustrated more clearly through its application to the example illustrated in FIG. 2. That is a VCR 200 being synchronized with a display 214 via an embodiment of the invention. Data from the VCR 200 representing video data 202 is decoded by decoder 204 and coupled into the data port 605 of FIG. 6. The data represents lines of video data. Lines of video data are separated by blanking or sync periods in which no data for display is provided. The write address register 603 of the write control 601 continually provides addresses for the VCR data 605 to be written into the FIFO queue 607, which is implemented within the core memory cell array 625.

When a sync period is detected within the video data, signifying that an end of line has been reached and a new line of video data is soon to begin, the decoder 204 produces a pulse in the save write pointer signal 627. The write control 601 synchronizes, the save write pointer signal 627 to the write clock 604 and passes it to the read control 611 as the WCS_SWP 631. The latch 617 within the read control 611 captures the write address 621, when it receives the write clock synchronized save write pointer pulse 424. Since this write address 621 is within the blanking period of the video data 202, the next write address will contain the beginning of a new line of video data 202.

When the encoder 212 is finished displaying a line of data, it produces a pulse 422 in the load write pointer line 629. When the read control 611 receives the load write pointer pulse 422, it couples the address in the latch 617, containing the write address for the beginning of a new line of data, into the read address register 613. The coupling of the address of the write pointer into the read address register 613 is done at a time when the read register 613 has stopped reading data from the FIFO queue. In other words the read control has finished reading the end of a line. When the saved write address is written into the read register 613 occurs, the read control now has the address of the beginning of a new line of video data. When the read control 611 begins to display the next line it will start the display from the address contained in the latch 617 which has been coupled into the read register 615, that synchronizing point is the address of a new line of video data as provided by the write control 601. In this manner the reading of video data from the beginning of a line is synchronized to data which has been written as the beginning of a data line.

In this way, the read control is continuously line-by-line synchronizing its reading of the lines of data to addresses which the write control indicates represent the beginning of a line of data. Thus, the read control can be resynchronized to the beginning of a line of video data. Because this synchronization can occur every line, any underflow or overflow of the data in the FIFO will only affect the display of the line in which it happens, and not the following lines in the field.

This synchronization of the read control to the write control has been illustrated for a beginning of line point for the sake of clarity and ease of understanding. Those skilled in the art will recognize that the synchronization points for the read and the write control can be any arbitrary point and that the beginning of a line of data was selected in the foregoing example, for the purpose of illustration and clarity only and was not meant to limit the application of the invention to an embodiment which synchronizes at the beginning of a line of data. In fact, in further embodiments, the data need not be synchronized line-by-line. The data may be synchronized several times per line at several points within the data stream or it may be synchronized every N lines where N represents some arbitrary number. The synchronizing of data at several points during a line would be useful in such applications where, for example, one stream of data were to be superimposed upon another stream of data such as in the case where a picture-in-picture display were presented on a display screen Those skilled in the art will also recognize that the example given of synchronizing of video data is also for illustration and instruction purpose only. Embodiments of the invention can be used to synchronize data systems which produces data to other data systems that consume that data.

The foregoing descriptions of exemplary embodiments of the present disclosure has been presented for the purpose of illustration and description. It is not intended to be exhaustive or to limit the inventive concepts to the precise embodiments disclosed. Many modifications and variations are possible in light of the above teaching. It is intended that the scope of the invention be limited not within this detailed description, but rather by the claims appended hereto, which appear below.

What is claimed is:

1. An apparatus for synchronizing data from an asynchronous data providing unit to a data accepting unit, the apparatus comprising:
   a data input for accepting data from the data providing unit;
   a data storage device for receiving and storing the data from the data providing unit, prior to said data being provided to the data accepting unit;
   a write pointer having a value for indicating the location within the storage device where the current input data is being stored;
   a save write pointer input for accepting a synchronizing signal from the data providing unit indicating that a synchronizing point has been reached and that the current value of the write pointer is to be saved;
   a data output for providing data to the data accepting unit;
   a read pointer having a value for indicating the location within the storage device from which the current output data is being read; and
   a load write pointer input for accepting a load write pointer signal indicating that the synchronizing point has been reached by the write pointer and that the saved write pointer value is to be written into the read pointer,
   wherein the synchronization point within a horizontal video line further comprises a plurality of synchronization points.

2. An apparatus as in claim 1, wherein the data storage device is a FIFO queue.

3. An apparatus as in claim 1, further comprising a latch for saving a value of the write pointer, the latch being capable of saving several successive synchronizing values.

4. An apparatus as in claim 1, wherein the data input for accepting data written to it from the data providing unit further comprises a data input for accepting video data.

5. An apparatus as in claim 4, wherein the save write pointer input for accepting a synchronizing signal from the data providing unit indicating that the current value of the write pointer is to be saved in the latch accepts a synchronizing signal only once per horizontal scan line.

6. An apparatus as in claim 4, wherein the save write pointer input for accepting a synchronizing signal from the data providing unit indicating that the current value of the write pointer is to be saved in the latch accepts a synchronizing signal only once per horizontal scan line during a period when a first line has ended and the next line has not yet begun.

7. A method of synchronizing data from an asynchronous data providing unit to a data accepting unit the method comprising:
   accepting data from the data providing unit;
   writing the data into a storage device at a location pointed at by a write pointer;
   providing a save write pointer signal corresponding to a desired synchronization position within the data provided by the data providing unit;
   saving the write pointer value at a point indicating that the desired synchronization point has been reached;
   reading data from the storage device at a position pointed to by a read pointer; and
   coupling the saved write pointer into the read pointer when the data accepting unit is reading data corresponding to the desired synchronization position,
   wherein writing the data into a storage device at a location pointed at by a write pointer comprises writing video data into a storage device, and
   wherein coupling the saved write pointer into the read pointer when the data accepting unit is reading data corresponding to the desired synchronization position comprises coupling the saved write pointer into the read pointer when the data accepting unit is reading data corresponding to a predetermined point within a horizontal video line, and
   wherein the desired synchronization point within the horizontal video line further comprises a plurality of synchronization points.

8. A method as in claim 7, wherein the step of writing the data into a storage device at a location pointed at by a write pointer further comprises writing data into a FIFO queue.

9. A method as in claim 7, wherein the plurality of synchronization points within the horizontal video line further comprises a plurality of points between the end of a horizontal line and the start of the next horizontal line.

10. Apparatus for synchronizing a video decoder to a video encoder the apparatus comprising:
    a first timing generator for accepting an analog video signal and for producing signals comprising:
    a decoder H active signal wherein the H active signal indicates whether video data is present or if one horizontal display line has completed and another horizontal display line has not yet begun (horizontal blanking period),
    a sampled digital video stream produced from periodic sampling of the analog video input, and
    a digital clock signal (DCLK) representing the periodic sampling of the video stream;
    a write control for accepting the H active signal, the DCLK signal, and a synchronizing point, and producing a save write pointer signal (SWP) which indicates that a synchronization point has occurred;
    a FIFO queue for accepting the data from the sampled digital video stream;

a write pointer for indicating the location at which the data from the sampled digital video stream is written into the FIFO queue;

a second timing generator for producing signals comprising:
   an encoder H active signal indicating that the beginning of a horizontal line has occurred and has not yet ended, and
   an encoder clock for synchronizing reading of the FIFO;

a read control for accepting the encoder clock and the H active signal and producing a load write pointer signal upon the coincidence of the write pointer with the synchronizing point;
   a latch for saving the write address upon occurrence of the SWP signal;
   a read pointer for indicating the address at which data is being read from the FIFO into a data output; and
   a circuit for coupling the saved write address from the latch into the read pointer upon occurrence of the load write pointer signal indicating the detection of the synchronizing point, wherein the synchronizing point occurs several times per horizontal line.

11. An apparatus as in claim 10, further comprising a decoder V active signal indicating that a decoder vertical scan is active and providing a further signal coupled to the write control for the generation of the synchronizing point.

12. An apparatus as in claim 10, further comprising an encoder V active signal indicating that an encoder vertical scan is active and providing a further signal coupled to the read control for interpretation of the synchronizing point.

13. An apparatus as in claim 10, wherein the synchronizing point occurs during the horizontal blanking period.

14. An apparatus as in claim 10, wherein the FIFO contains several lines of data and several successive synchronizing points to ensure that the encoder drift will not allow the FIFO to empty in one vertical scan.

15. An apparatus as in claim 10, wherein the encoding process of the FIFO is delayed for several lines after initiation of a decoder vertical scan in order to fill the FIFO with several lines of vertical data.

16. An apparatus as in claim 10, further containing a reset circuit such that the detection of a coincident encoder vertical blanking period and decoder vertical blanking period resets the read pointer and the write pointer to a zero point in the FIFO queue.

17. An apparatus for synchronizing data from an asynchronous data providing unit to data accepting unit, the apparatus comprising:
   means for accepting data from the data providing unit;
   means for writing the data into a storage mechanism at a location pointed at by a write pointer;
   means for providing a save write pointer signal corresponding to a desired synchronization position within the data provided by the data providing unit;
   means for saving the write pointer value at a point indicated by the save write pointer signal;
   means for reading data from the storage mechanism at a position to by a read pointer; and
   means for coupling the saved write pointer into the read pointer when the data accepting unit is reading data corresponding to the desired synchronization position, wherein writing the data into a storage mechanism at a location pointed at by a write pointer comprises writing video data into a storage mechanism, and wherein coupling the saved write pointer into the read pointer when the data accepting unit is reading data corresponding to the desired synchronization position comprises coupling the saved write pointer into the read pointer when the data accepting unit is reading data corresponding to a predetermined point within a horizontal video line, and wherein the desired synchronization point within the horizontal video line further comprises a plurality of synchronization points.

* * * * *